(12) United States Patent
Rahat et al.

(10) Patent No.: US 12,718,559 B2
(45) Date of Patent: Aug. 25, 2026

(54) ELECTRONIC DEVICE AND METHOD FOR CONTROLLING OUTPUT DEVICE

(71) Applicant: Samsung Electronics Co., Ltd., Suwon-si (KR)

(72) Inventors: Imran Khan Rahat, Dacca (BD); Anirudha Paul, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 18/779,898

(22) Filed: Jul. 22, 2024

(65) Prior Publication Data

US 2024/0378885 A1 Nov. 14, 2024

Related U.S. Application Data

(63) Continuation of application No. PCT/KR2023/000810, filed on Jan. 17, 2023.

(30) Foreign Application Priority Data

Jan. 25, 2022 (KR) ........................ 10-2022-0011062
Apr. 5, 2022 (KR) ........................ 10-2022-0042524

(51) Int. Cl.
*G06V 20/20* (2022.01)

(52) U.S. Cl.
CPC .................................. *G06V 20/20* (2022.01)

(58) Field of Classification Search
CPC ..................................................... G06V 20/20
See application file for complete search history.

(56) References Cited

U.S. PATENT DOCUMENTS 8,874,448 B1 10/2014 Kauffmann et al.
9,727,129 B2 8/2017 Di Censo et al.
(Continued)

FOREIGN PATENT DOCUMENTS

EP 3659028 A1 6/2020
JP 6612250 B 11/2019
(Continued)

OTHER PUBLICATIONS

International Search Report dated May 8, 2023, issued in International Patent Application No. PCT/KR2023/000810.
(Continued)

*Primary Examiner* — Mishawn N. Hunter
(74) *Attorney, Agent, or Firm* — Jefferson IP Law, LLP

(57) ABSTRACT

An electronic device configured to control an output device, and an operating method thereof are provided. The electronic device includes memory storing one or more computer programs, and one or more processors communicatively coupled to the at least one input device, the at least one output device, and the memory, wherein the one or more computer programs include computer-executable instructions that, when executed by the one or more processors individually or collectively, cause the electronic device to obtain surrounding situation information from an input
(Continued)

device, determine an importance of the surrounding situation information by using at least one of usage history or a conversation record of a user, and output the surrounding situation information through an output device based on the determined importance of the surrounding situation information.

20 Claims, 11 Drawing Sheets

(56) References Cited

U.S. PATENT DOCUMENTS

| | | | | |
|---|---|---|---|---|
| 10,224,019 | B2 | 3/2019 | Mitchell et al. | |
| 10,347,254 | B2 | 7/2019 | Forutanpour et al. | |
| 10,529,359 | B2 | 1/2020 | Tomlin et al. | |
| 10,536,783 | B2 | 1/2020 | Sanger et al. | |
| 10,643,637 | B2 | 5/2020 | Boulanger et al. | |
| 10,679,648 | B2 | 6/2020 | Tomlin et al. | |
| 10,848,872 | B2 | 11/2020 | Poornachandran et al. | |
| 2013/0072251 | A1 | 3/2013 | Kim et al. | |
| 2018/0189568 | A1 | 7/2018 | Powderly et al. | |
| 2020/0017026 | A1* | 1/2020 | Kumar | B60R 1/27 |
| 2020/0120199 | A1 | 4/2020 | Maeng et al. | |
| 2020/0389551 | A1* | 12/2020 | Vaughn | H04M 3/42059 |
| 2021/0092232 | A1 | 3/2021 | Norris et al. | |
| 2023/0214966 | A1* | 7/2023 | Santhar | G06N 3/088<br>345/633 |

FOREIGN PATENT DOCUMENTS

| | | | |
|---|---|---|---|
| KR | 10-2013-0085653 | A | 7/2013 |
| KR | 10-2018-0044641 | A | 5/2018 |
| KR | 10-2019-0099170 | A | 8/2019 |
| KR | 10-2097710 | B1 | 5/2020 |
| KR | 10-2020-0104759 | A | 9/2020 |

OTHER PUBLICATIONS

Tanabe et al.; Probabilistic 3D Sound Source Mapping System Based on Monte Carlo Localization Using Microphone Array and LIDAR, Journal of Robotics andMechatronics, vol. 29, No. 1, Feb. 2017.

Jason Odom; Add Eye Tracking to Your Existing Mixed Reality Devices with Pupil Labs, Jul. 20, 2017.

Tarko et al., Real-time Virtual Object Insertion for Moving 360° Videos, Nov. 18, 2019.

Korean Office Action dated Feb. 4, 2026, issued in Korean Application No. 10-2022-0042524.

* cited by examiner

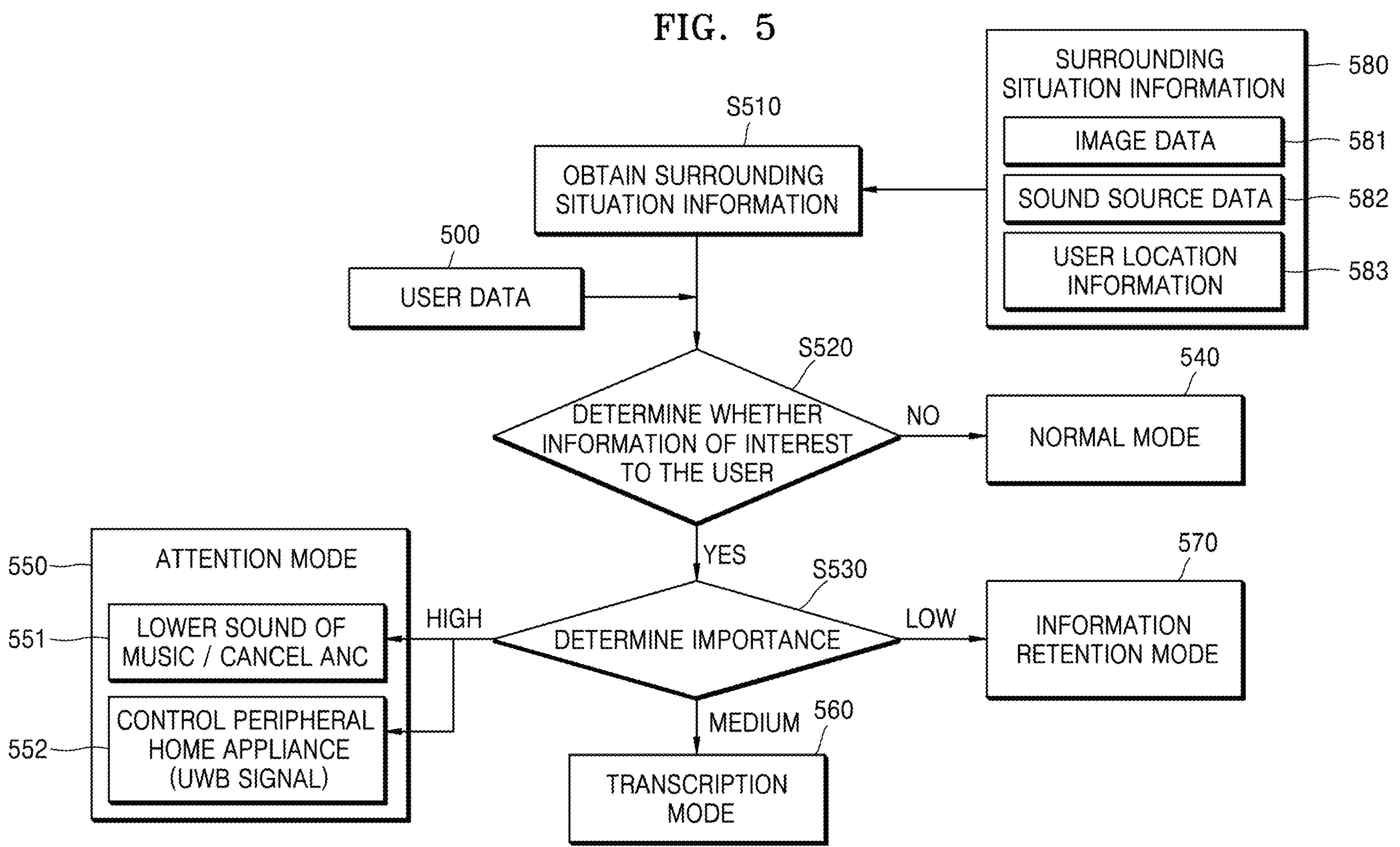

FIG. 5
580
SURROUNDING SITUATION INFORMATION
581
IMAGE DATA
582
SOUND SOURCE DATA
583
USER LOCATION INFORMATION
S510
OBTAIN SURROUNDING SITUATION INFORMATION
500
USER DATA
S520
DETERMINE WHETHER INFORMATION OF INTEREST TO THE USER
NO
540
NORMAL MODE
YES
S530
DETERMINE IMPORTANCE
LOW
570
INFORMATION RETENTION MODE
MEDIUM
560
TRANSCRIPTION MODE
HIGH
550
ATTENTION MODE
551
LOWER SOUND OF MUSIC / CANCEL ANC
552
CONTROL PERIPHERAL HOME APPLIANCE (UWB SIGNAL)

<SCORE CLASSIFICATION TABLE ACCORDING TO USER CUSTOMIZED SURROUNDING SITUATION INFORMATION>

ELECTRONIC DEVICE AND METHOD FOR CONTROLLING OUTPUT DEVICE

CROSS-REFERENCE TO RELATED APPLICATION(S)

This application is a continuation application, claiming priority under § 365 (c), of an International application No. PCT/KR2023/000810, filed on Jan. 17, 2023, which is based on and claims the benefit of a Korean patent application number 10-2022-0011062, filed on Jan. 25, 2022, in the Korean Intellectual Property Office, and of a Korean patent application number 10-2022-0042524, filed on Apr. 5, 2022, in the Korean Intellectual Property Office, the disclosure of each of which is incorporated by reference herein in its entirety.

BACKGROUND

1. Field

The disclosure relates to augmented reality devices that virtually display a virtual image on a real object. More particularly, the disclosure relates to an augmented reality device that controls itself or peripheral devices according to importance by detecting surrounding situations, and an operating method thereof.

2. Description of Related Art

Augmented Reality is a technique of overlaying a virtual image on a physical environment space or real world object in the real world and showing the virtual image together with the real world space or object. Augmented reality devices using augmented reality technology (e.g., smart glasses) are useful in everyday life, such as for information retrieval, route guidance, and camera photography.

In general, the augmented reality devices may be worn by a user and provide images to the user through a see-through display close to the user's eyes. Here, an image includes one or more real objects within a physical environment or space that the user directly sees through his or her eyes. The augmented reality devices transfer a virtual image to the user's eyes through the see-through display, so that the user may view the real object and the virtual image through the see-through display at the same time.

The augmented reality device generally includes not only a display but also an audio output unit (e.g., earphones) for providing auditory information to the user. The augmented reality device provides at least one of a virtual image and auditory information to the user as necessary, and the user may view the virtual image through the see-through display or simultaneously listen to music or a guidance voice through the audio output unit.

However, earphones in the art have a drawback in that the volume and a noise canceling mode are controlled based only on auditory information of the surrounding situations without visual information. Specifically, when the user is exposed to a dangerous situation or is in an emergency situation, or when the user is not aware of an important conversation situation and this must be notified to the user, a method of controlling the device solely by auditory information has limitations. For an optimal user experience, there is a demand for a technique in which the device identifies surrounding situations that may not be recognized by the user (e.g., when someone is talking to the user or when it is almost time to check in for a flight at an airport) and controls itself or peripheral devices to connect the user with the real world.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device configured to determine an importance of content of a conversation in the real world based on at least one of past data, visual information about a surrounding situation, and auditory information of a user of the device, and according to the determined importance, lower a volume of music being reproduced in the device, transcribe the conversation content on a display, or store the conversation content in memory and inform about same later, and an operating method thereof.

Another aspect of the disclosure is to provide a device configured to inform the device user about information necessary for the device user by comparing user data (e.g., a flight schedule in a schedule management application) obtained from a terminal used by the device user with visual and auditory information about the surrounding situation, and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes at least one input device, at least one output device, memory storing one or more computer programs, and one or more processors communicatively coupled to the at least one input device, the at least one output device, and the memory, wherein the one or more computer programs include computer-executable instructions that, when executed by the one or more processors individually or collectively, cause the electronic device to obtain surrounding situation information from the at least one input device, determine an importance of the surrounding situation information by using at least one of usage history or a conversation record of a user, and output the surrounding situation information through the at least one output device based on the determined importance of the surrounding situation information.

In an embodiment of the disclosure, the at least one input device further includes at least one microphone, and the at least one processor may be configured to obtain sound source data from the at least one microphone, and determine an importance of the surrounding situation information by further using the sound source data.

In an embodiment of the disclosure, the at least one input device further includes at least one photographing unit, and the at least one processor may be configured to obtain image data from the at least one photographing unit, and determine the importance of the surrounding situation information by using the image data.

In an embodiment of the disclosure, the at least one input device further includes a microphone configured to recognize surrounding conversation content or sound sources, a photographing unit configured to recognize the faces or actions of surrounding people, and a first sensor configured to detect data related to a user's location, wherein the processor may obtain sound source data from the microphone, obtain image data from the photographing unit, obtain user location information representing a current location of the user by using the first sensor, and determine an importance of the surrounding situation information by using the sound source data, the image data, and the user location information.

In an embodiment of the disclosure, the electronic device further includes an ultra-wideBand (UWB) communication circuit, and the processor receives a UWB signal from a peripheral home appliance through the UWB communication circuit, obtain direction information and distance information of the peripheral home appliance based on the received UWB signal, and transmit a control signal to the peripheral home appliance according to the determined importance of the surrounding situation information based on the obtained direction information and distance information.

In an embodiment of the disclosure, the processor identifies a type of output data and at least one output device corresponding to the type of the output data from among the at least one output device based on the determined importance of the surrounding situation information, and control the at least one identified output device to output the output data.

In accordance with another aspect of the disclosure, a method by which an electronic device controls at least one output device is provided. The method includes obtaining surrounding situation information from at least one input device, determining an importance of the surrounding situation information by using at least one of usage history and a conversation record of a user using the electronic device, stored in the memory, and outputting the surrounding situation information through the at least one output device based on the determined importance of the surrounding situation information.

In an embodiment of the disclosure, the determining of the importance of the surrounding situation information includes obtaining sound source data from a microphone, and determining the importance of the surrounding situation information by further using the sound source data. In an embodiment of the disclosure, the determining of the importance of the surrounding situation information includes obtaining image data from a photographing unit, and determining the importance of the surrounding situation information by further using the image data.

In an embodiment of the disclosure, the determining of the importance of the surrounding situation information includes obtaining sound source data from a microphone, obtaining image data from a photographing unit, and determining the importance of the surrounding situation information by further using the sound source data and the image data.

In an embodiment of the disclosure, the determining of the importance of the surrounding situation information includes obtaining user location information representing a current location of a user from a first sensor configured to detect data related to a user location, obtaining image data from a photographing unit, and determining the importance of the surrounding situation information by further using the image data and the user location information.

In an embodiment of the disclosure, the determining of the importance of the surrounding situation information includes obtaining user location information representing a current location of a user from a first sensor configured to detect data related to a user location, obtaining sound source data from a microphone unit, and determining the importance of the surrounding situation information by further using the sound source data and the user location information.

In an embodiment of the disclosure, the determining of the importance of the surrounding situation information includes obtaining sound source data from a microphone, obtaining user location information representing a current location of a user from a first sensor configured to detect data related to a user location, obtaining image data from a photographing unit, and determining the importance of the surrounding situation information by further using the sound source data, the user location information, and the image data.

In an embodiment of the disclosure, the transmitting of the control signal to the peripheral home appliance includes receiving a UWB signal from a peripheral home appliance, obtaining direction information and distance information of the peripheral home appliance based on the received UWB signal, and transmitting the control signal to the peripheral home appliance according to a determined importance of audio data based on the obtained direction information and distance information.

In an embodiment of the disclosure, the determining of the importance of the surrounding situation information includes obtaining a score for the importance of the surrounding situation information, and determining surrounding situation information of which the score is a preset first threshold or more.

In an embodiment of the disclosure, the controlling of the at least one output device includes identifying, based on the determined importance, a type of output data and at least one output device corresponding to the type of the output data from among the at least one output device, and controlling the at least one identified output device to output the output data.

In accordance with another aspect of the disclosure, one or more non-transitory computer-readable storage media storing computer-executable instructions that, when executed by one or more processors individually or collectively, cause the electronic device to perform operations are provided. The operations include obtaining surrounding situation information from at least one input device, determining an importance of the surrounding situation information by using at least one of usage history and a conversation record of a user using the electronic device, and outputting the surrounding situation information through at least one output device based on the determined importance of the surrounding situation information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a flowchart illustrating a method of obtaining surrounding situation information and varying settings for an output device according to importance, according to an embodiment of the disclosure;

The same reference numerals are used to represent the same elements throughout the drawings.

DETAILED DESCRIPTION

Figure 1:
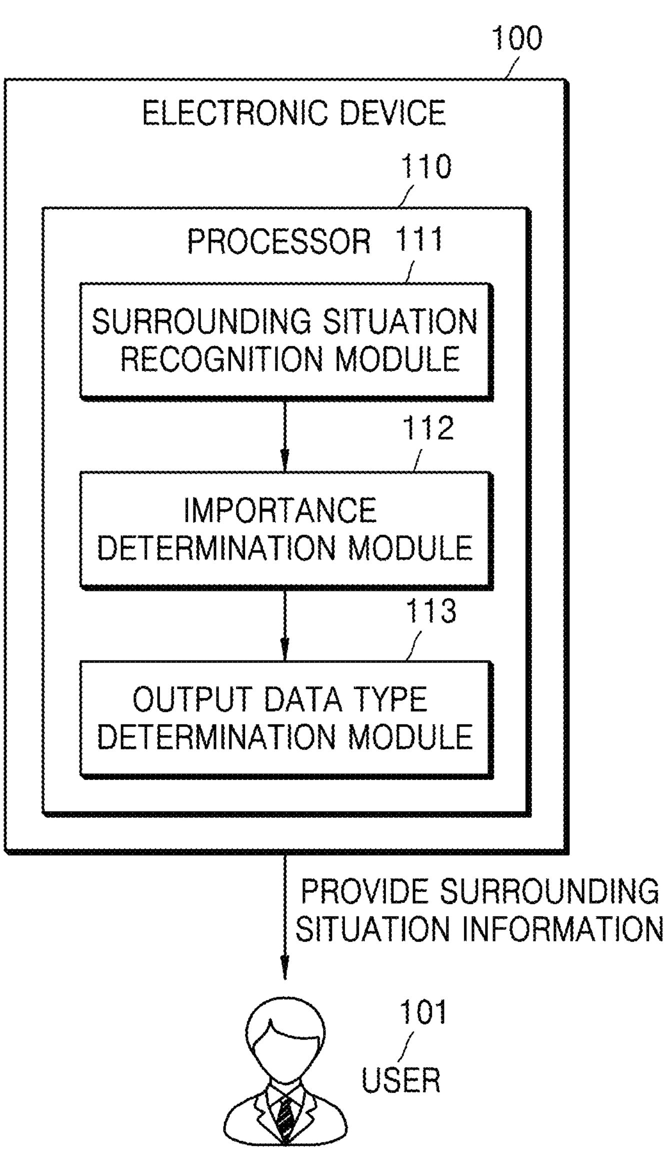
FIG. 1 is an overall conceptual diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the follow description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, when a part "includes" or "comprises" an element, unless there is a particular description contrary thereto, the part may further include other elements, not excluding the other elements. In addition, the term "unit" used herein means a software component or a hardware component, such as a field-programmable gate array (FPGA) or an application-specific integrated circuit (ASIC), and performs a specific function. However, the term "unit" is not necessarily limited to software or hardware. The term "unit" may be configured in an addressable storage medium or may be configured to reproduce one or more processors. Thus, for example, the term "unit" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and "units" may be combined into fewer components and "units" or may be further separated into additional components and "units".

In addition, terms, such as "unit" or "module" used herein refer to a unit for processing at least one function or operation, and this may be implemented as hardware, software, or a combination of hardware and software.

Herein, the term "surrounding situation information" refers to various situations that occur around a user of an electronic device. For example, the surrounding situation information may be content of a conversation between other people around the user of the electronic device, an electronic display board notification of a flight departure time at an airport, or a situation in which someone is talking to the user of the electronic device.

Herein, the term "augmented reality (AR)" refers to showing a virtual image together in a physical environment space in the real world or showing a real object and a virtual image together.

In addition, the term "augmented reality device" is a device capable of representing "AR", and generally includes not only augmented reality glasses in the shape of glasses that a user wears on the face, but also head mounted display apparatuses worn on the head, or AR helmets.

Herein, the term "virtual image" is an image generated through an optical engine and may include both static images and dynamic images. These virtual images are observed together with a real scene and may be virtual images representing information about real objects in the real scene or information about an operation of an augmented reality device, or a control menu.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is an overall conceptual diagram of an electronic device according to an embodiment of the disclosure.

Referring to FIG. 1, according to an embodiment of the disclosure, a processor 110 of an electronic device 100 includes a surrounding situation recognition module 111, an importance determination module 112, and an output data type determination module 113.

The surrounding situation recognition module 111 obtains surrounding situation information, and the importance determination module 112 determines importance of the surrounding situation information. The output data type determination module 113 controls an output device according to the determined importance and provides the surrounding situation information of an output data type suitable for a user 101 of the electronic device. Through this, the user may not miss out on the surrounding situation information while using the electronic device 100 and simultaneously, may achieve an optimal user experience with minimal disruption to the use of the electronic device.

Here, a standard of importance of surrounding situation information may vary depending on the user 101 of the electronic device, and a method of determining the standard of importance of surrounding situation information does not limit the technical idea of the disclosure. For example, a method of classifying importance may depend on setting values of the user.

Meanwhile, herein, for convenience of description, for example, a case is described in which the electronic device 100 is an AR device. However, the disclosure is not limited thereto.

Figure 2:
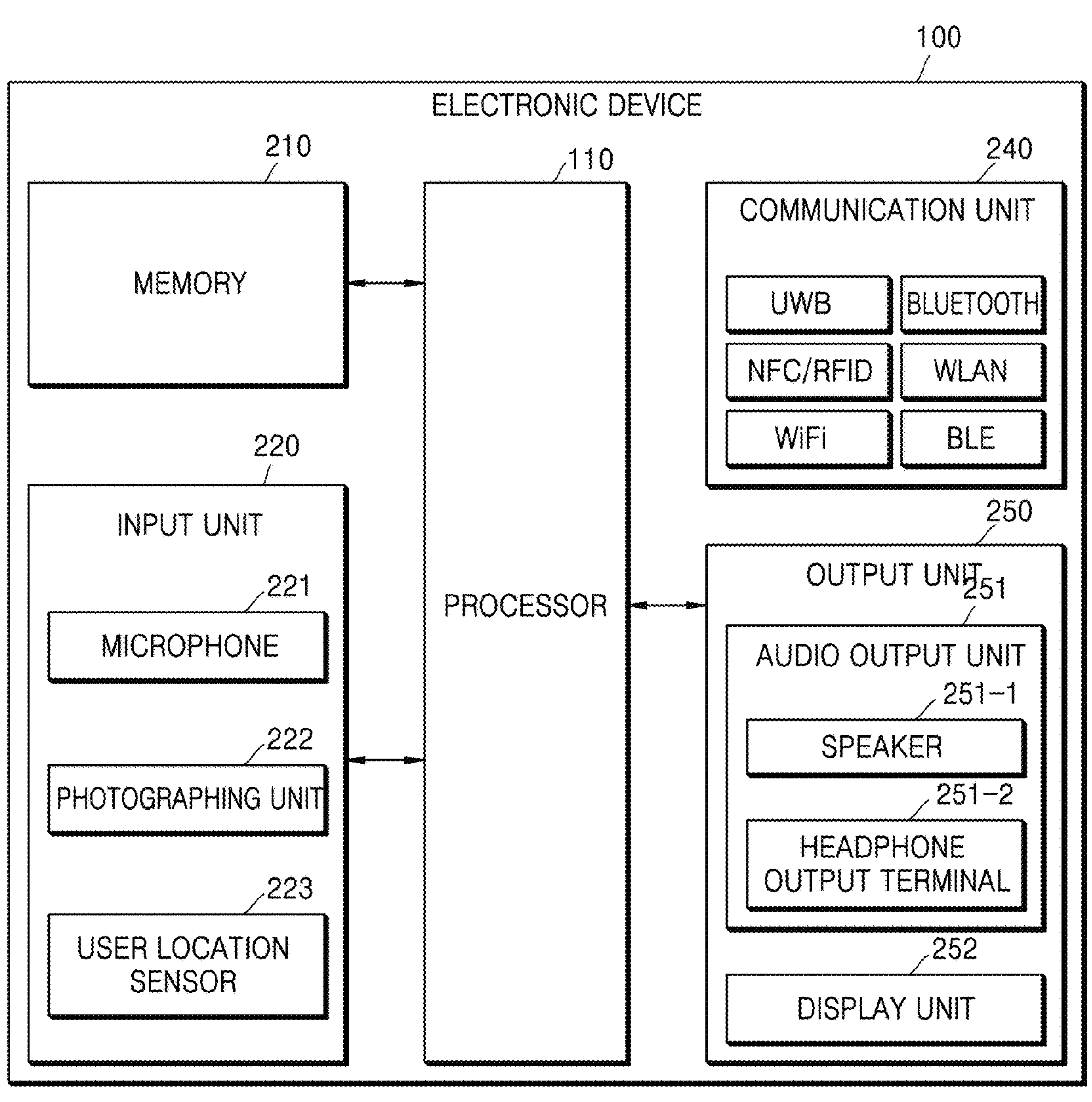
FIG. 2 is a block diagram illustrating elements of an electronic device according to an embodiment of the disclosure.

FIG. 2 is a block diagram showing elements of an electronic device according to an embodiment of the disclosure.

Referring to FIG. 2, the electronic device 100 according to an embodiment of the disclosure is an electronic device capable of determining importance of surrounding situation information and controlling an output device according to the determined importance, and specifically, may be an AR device having a display and a headset. The electronic device may include various types of devices that may be used by the user, such as a mobile phone, a tablet personal computer (PC), a personal digital assistant (PDA), a moving picture experts group (MPEG-1 or MPEG-2) audio layer III (MP3) player, a kiosk, an electronic frame, a navigation device, a digital television (TV), a wristwatch, or a wearable device, such as a virtual reality (VR) headset or a head-mounted display (HMD). The electronic device 100 according to an embodiment of the disclosure may include memory 210, an input unit 220, the processor 110, a communication unit 240, and an output unit 250. Hereinbelow, the elements described above are discussed in turn.

The memory 210 may store programs for processing and control of the processor 110 and may store surrounding situation information or output data. The memory 210 according to an embodiment of the disclosure may store one or more instructions. For example, the memory 210 may be configured as a storage medium of at least one type from among flash memory type, hard disk type, multimedia card micro type, card type memory (e.g., secure digital (SD) or extreme digital (XD) memory), random access memory (RAM), static RAM (SRAM), read-only memory (ROM), electrically erasable programmable ROM (EEPROM), programmable ROM (PROM), or optical disk.

At least one of instructions, algorithms, data structures, program codes, and application programs that are readable by the processor 110 may be stored in the memory 210. For example, the instructions, algorithms, data structures, and program codes stored in the memory 210 may be implemented in programming or scripting languages, such as C, C++, Java, or assembler.

The input unit 220 may include various sensors configured to obtain surrounding situation information, and examples of sensors may include, for example, a microphone 221, a photographing unit 222, and a user location sensor 223, but are not limited thereto.

The microphone 221 may obtain sound source data from surrounding situation information. In an embodiment of the disclosure, the sound source data may be content of a conversation between people around. For example, an analog voice of a person received by the microphone 221 may be digitized and transmitted to the processor 110.

In an embodiment of the disclosure, the sound source data may be a sound generated by a peripheral home appliance. For example, when the sound source received from the microphone is not a human voice, the processor 110 may obtain volume information of the sound source data.

The photographing unit 222 may obtain image data from the surrounding situation information. In an embodiment of the disclosure, the image data may include faces of people around or actions of people around. For example, the processor 110 may analyze image data and identify a person nearby as registered in user data by using facial recognition included in the image data, or recognize a specific action (e.g., waving a hand or snapping a finger). For example, the photographing unit 222 is a camera provided in the electronic device and may be, for example, a depth camera or an infrared (IR) camera.

The user location sensor 223 may obtain user location information from the surrounding situation information. For example, the user location sensor may be a GPS sensor and may transmit the obtained user location information to the processor 110.

The processor 110 may control overall operations of the electronic device 100, and execute one or more instructions stored in the memory 210 to control the operations of the electronic device 100. For example, the processor 110 may execute programs stored in the memory 210 to generally control the memory 210, the input unit 220, the communication unit 240, and the output unit 250. The communication unit 240 may include one or more elements that enable communication between the electronic device 100 and a plurality of devices located around the electronic device 100. The communication unit 240 may include one or more elements that enable communication between the electronic device 100 and a server. Specifically, the communication unit 240 may perform communication with external devices or servers of various types according to communication schemes of various types. In addition, the communication unit 240 may include a short-range wireless communication unit.

The short-range wireless communication unit may include a Bluetooth communication unit, a Bluetooth low energy (BLE) communication unit, a near field communication unit, a wireless fidelity (Wi-Fi) (WLAN) communication unit, a Zigbee communication unit, an infrared data association (IrDA) communication unit, a wi-fi Direct (WFD) communication unit, an ultra-wideband (UWB) communication unit, an Ant+ communication unit, and an Ethernet communication unit, but is not limited thereto.

Specifically, when each operation performed in the processor 110 is performed in a server (not shown), the electronic device 100 may be connected to the server through a Wi-Fi module or an Ethernet module of the communication unit 240, but is not limited thereto. In this case, the server may represent a cloud-based server. In addition, the electronic device 100 may be connected to an external electronic device that receives voice signals through the Bluetooth communication unit or the Wi-Fi communication unit of the communication unit 240, but is not limited thereto. For example, the electronic device 100 may be connected to an external electronic device that receives voice signals through at least one of the Wi-Fi module and the Ethernet module of the communication unit 240.

The output unit 250 may include an audio output unit 251 and a display unit 252.

The audio output unit 251 may include at least one of a speaker 251-1 or a headphone output terminal 251-2. The processor 110 according to an embodiment of the disclosure may output an audio signal stored in the memory 210 through the audio output unit 251. The processor 110 according to an embodiment of the disclosure may control an intensity of an audio signal being output, according to determined importance of surrounding situation information. The processor 110 according to an embodiment of the disclosure may disable a noise canceling function of the headphone output terminal 251-2 according to the determined importance of the surrounding situation information.

The display unit 252 is configured to generate light of a virtual image and may be an optical engine of a projector including an image panel, an illumination optical system, a projection optical system, or the like. The display unit 252 may include a left-eye display unit and a right-eye display unit. The display unit 252 may include a light source that outputs light, an image panel that forms a two-dimensional virtual image by using the light output from the light source, and a projection optical system that projects light of the virtual image formed on the image panel. The light source is an optical component that illuminates light, and may generate light by adjusting red, green, and blue (RGB) colors. The light source may include, for example, a light-emitting diode (LED). The image panel may be configured as a reflective image panel that modulates light illuminated by the light source into light containing a two-dimensional image and reflects same. For example, the reflective image panel is a digital micromirror device (DMD) panel or a liquid crystal on silicon (LCoS) panel, or may be another known reflective image panel.

The display unit 252 may obtain image data constituting a virtual image from the processor 110, generate a virtual image based on the obtained image data, and project light constituting a virtual image output from the light source through a light-emitting surface.

However, not all of the elements shown are necessarily essential elements. The electronic device 100 may be implemented by more elements than shown, or may be implemented by fewer elements than shown.

Figure 3:
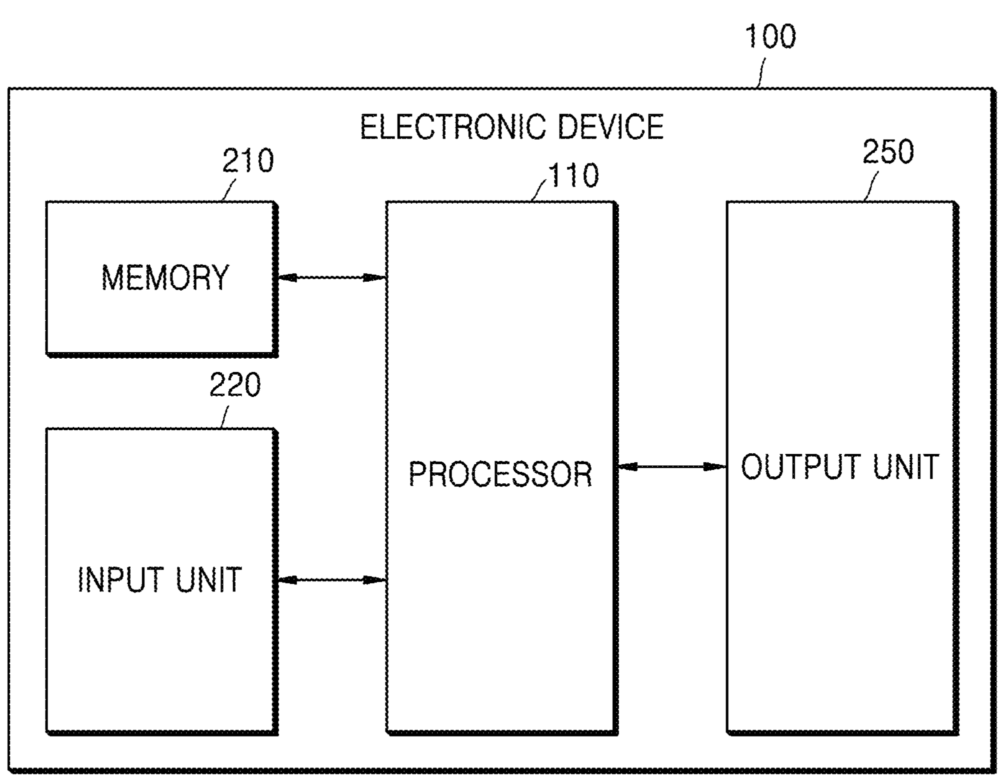
FIG. 3 is a block diagram illustrating an electronic device for notifying a user about surrounding situation information, according to an embodiment of the disclosure.

FIG. 3 is a block configuration diagram illustrating an electronic device for notifying a user about surrounding situation information, according to an embodiment of the disclosure.

Referring to FIG. 3, the electronic device 100 according to an embodiment of the disclosure may include the memory 210, the processor 110, the input unit 220, and the output unit 250. Hereinbelow, the elements described above are discussed in turn.

The processor 110 according to an embodiment of the disclosure may execute one or more instructions stored in the memory 210 to obtain surrounding situation information from the input unit 220, to determine an importance of the surrounding situation information by using at least one of usage history or a conversation record of the user, and to output the surrounding situation information through the at least one output device based on the determined importance. According to an embodiment of the disclosure, the input unit 220 may be a microphone, a photographing unit, and a user location sensor, but is not limited thereto.

The processor 110 according to an embodiment of the disclosure may execute the one or more instructions stored in the memory 210 to obtain sound source data and determine the importance of the surrounding situation information by using the sound source data. For example, the sound source data may be obtained by using a built-in microphone of the electronic device 100. In an embodiment of the disclosure, a communication unit may receive sound source data obtained from another electronic device, for example, a wearable device.

The processor 110 according to an embodiment of the disclosure may execute one or more instructions stored in the memory 210 to obtain image data and determine the importance of surrounding situation information by using the image data. For example, the image data may be obtained by using a built-in camera of the electronic device 100. In an embodiment of the disclosure, image data obtained from another electronic device (e.g., a smartphone or a wearable device) may be received.

The processor 110 according to an embodiment of the disclosure may execute one or more instructions stored in the memory 210 to obtain sound source data and image data and determine the importance of surrounding situation information by using the sound source data and the image data. For example, the processor 110 may obtain sound source data from the built-in microphone of the electronic device 100 or may receive sound source data obtained from another device through a communication unit. In addition, the processor 110 may obtain image data from the built-in camera of the electronic device 100 or may receive image data obtained from another device through a communication unit.

The processor 110 according to an embodiment of the disclosure may execute one or more instructions stored in the memory 210 to obtain image data, to obtain user location information representing a current location of the user, and to determine the importance of surrounding situation information by further using the image data and the user location information. For example, the processor 110 may obtain user location information from the built-in GPS sensor of the electronic device 100 or may receive location information obtained from another device through a communication unit.

The processor 110 according to an embodiment of the disclosure may execute one or more instructions stored in the memory 210 to obtain sound source data and user location information that represents the current location of the user, and to determine the importance of surrounding situation information by using the sound source data and the user location information.

The processor 110 according to an embodiment of the disclosure may execute one or more instructions stored in the memory 210 to obtain image data, sound source data, and user location information that represents the current location of the user, and to determine the importance of surrounding situation information by using the image data, the sound source data, and the user location information.

The processor 110 according to an embodiment of the disclosure may execute one or more instructions stored in the memory 210 to receive a UWB signal from a peripheral home appliance, to obtain direction information and distance information of the peripheral home appliance based on the received UWB signal, and transmit a control signal to the peripheral home appliance according to importance of the peripheral home appliance determined based on the obtained direction information and distance information. In this case, an example of the communication unit is a UWB communication circuit, but the disclosure is not limited thereto.

The processor 110 according to an embodiment of the disclosure may execute one or more instructions stored in the memory 210 to obtain a score for the importance of surrounding situation information, to identify surrounding situation information of which the score is at least a first threshold that is preset, to identify a type of output data and at least one output device corresponding to the type of the output data based on the score of the identified surrounding situation information, and to control the at least one identified output device to output the output data.

A method of identifying an output device based on a score for the importance of surrounding situation information is described with reference to FIGS. 8A, 8B, and 8C.

Figure 4:
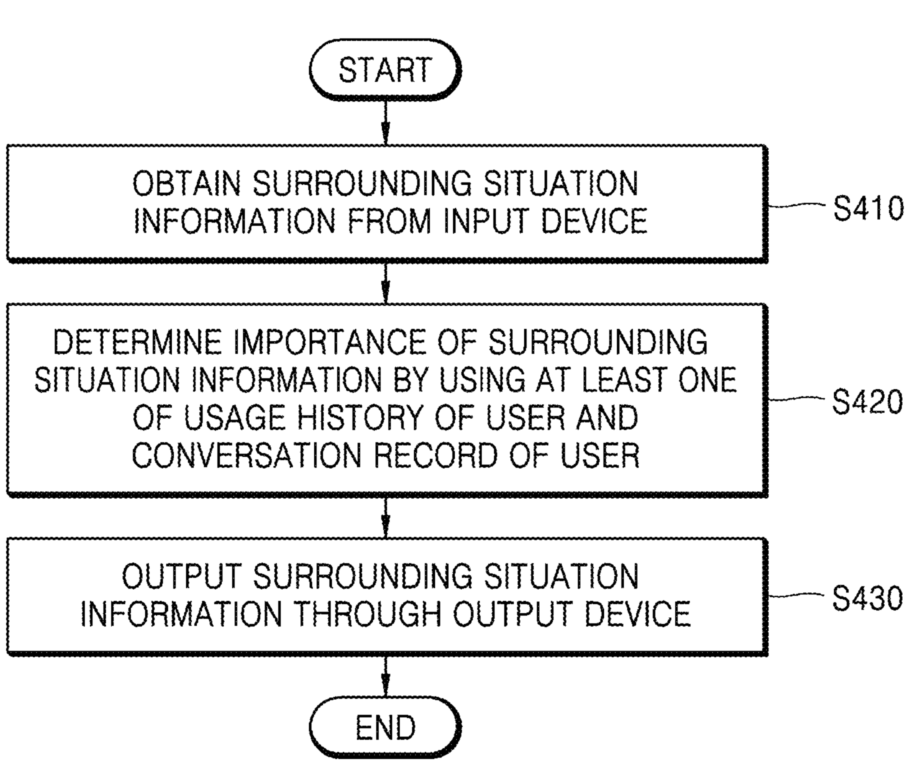
FIG. 4 is a flowchart for notifying a user about surrounding situation information, according to an embodiment of the disclosure.

FIG. 4 is a flowchart for notifying a user about surrounding situation information according to an embodiment of the disclosure.

Referring to FIG. 4, in operation S410, an electronic device obtains surrounding situation information from at least one input device.

The surrounding situation information may be received from an input device within the electronic device or from an external server. In an embodiment of the disclosure, the surrounding situation information may be sound source data, image data, or user location data.

In operation S420, the processor 110 determines importance of the surrounding situation information by using at least one of usage history of the user using the electronic device and a conversation record of the user. In an embodiment of the disclosure, the usage history of the user and the conversation record of the user may be stored in the memory 210 inside the electronic device or may be received from an external server.

In operation S430, the processor 110 outputs the surrounding situation information through at least one output device based on the determined importance of the surrounding situation information. Here, the at least one output device may be an audio output unit or a display unit, but is not limited thereto. In an embodiment of the disclosure, the processor 110 may determine non-urgent information in the surrounding situation information based on the importance of the surrounding situation information. The processor 110 may temporarily store the non-urgent information in the memory 210 and output same through the at least one output device after a predetermined time has elapsed.

For example, in a case in which the importance of the surrounding situation information received through the input unit 220 is determined to be "low", when the information is temporarily stored in the memory 210 and a predetermined condition is satisfied, the processor 110 may output same through the at least one output device. For example, the predetermined condition is a case in which the user does not perform any operation with the electronic device for a preset time period.

FIG. 5 is a flowchart illustrating a method of obtaining surrounding situation information and varying settings for an output device according to importance according to an embodiment of the disclosure.

Referring to FIG. 5, in operation S510, the electronic device 100 obtains surrounding situation information from at least one input device.

Surrounding situation information 580 may be received from an input device of the electronic device or from an external server. In an embodiment of the disclosure, the surrounding situation information 580 may include image data 581, sound source data 582, and user location information 583.

User data 500 may be usage history of the user or a conversation record of the user. The usage history of the user is data stored while the electronic device 100 or other devices are used, such as information about a family, friends, or coworkers of the user (e.g., facial recognition, where they live, where they usually meet, or a relationship with the user) or schedule information of the user (e.g., flight and train boarding plans stored in a schedule management application). The conversation record of the user is a conversation topic or keyword that the user selected to be important in past conversations with other people, and may be classified and stored according to importance. The usage history of the user and the conversation record of the user may be stored in the memory 210 inside the electronic device or may be received from an external server.

The electronic device 100 may determine whether the surrounding situation information is information of interest to the user by comparing whether the obtained surrounding situation information and the user data 500 match.

For example, when the obtained image data 581 is the face of a specific person, it may be compared as to whether the user data matches with the person's face pre-stored in the user data. In addition, when the obtained sound source data 582 is conversation content, it may be determined whether the obtained sound source data 582 is information of interest to the user by analyzing whether the user data includes pre-stored keywords of interest, if so, how many keywords of interest are used or the like. In addition, when the obtained surrounding situation information is the user location information 583, it may be determined whether the obtained surrounding situation information is information of interest to the user by identifying whether the location is a place pre-stored in the user data or a public place.

In operation S520, the electronic device 100 determines whether the surrounding situation information is information of interest to the user by comparing the obtained surrounding situation information with the user data. In this case, when the data does not match, it is determined that the surrounding situation information is not information of interest and a normal mode 540 is entered. Here, the normal mode 540 refers to a state in which the electronic device 100 does not perform any control. When the surrounding situation information and the user data match and it is determined that the surrounding situation information is information of interest to the user, an operation S530 of determining importance of the surrounding situation information is entered.

In operation S530, the electronic device 100 determines the importance of the surrounding situation information, and determines a type of output data based on the determined importance. In an embodiment of the disclosure, the importance of the surrounding situation information is classified into three levels.

When the importance is "high", an attention mode 550 is entered. In the attention mode, the electronic device 100 may lower an audio volume output from the electronic device 100. For example, in operation 551, the processor 110 may lower a volume of a sound source output through the speaker 251-1 or lower a volume of a sound source output through the headphone output terminal 251-2. In an embodiment of the disclosure, the electronic device 100 may disable the noise canceling function. For example, if the noise canceling function is activated when the attention mode is entered, it is difficult for the user 101 of the electronic device to notice a surrounding situation. If the electronic device 100 disables the noise canceling function or activates an ambient noise tolerance function, the user 101 may easily recognize the surrounding situation.

In addition, when there are home appliances nearby, in operation 552, the electronic device 100 may control the peripheral home appliances by considering the influence of the peripheral home appliances on the user. For example, the electronic device 100 may receive a UWB signal from a peripheral home appliance and adjust a volume of the home appliance by using distance information between the user of the electronic device and the peripheral home appliance. A method of controlling a peripheral home appliance is discussed with reference to FIG. 9.

When the importance is "medium", a transcription mode 560 is entered. In the transcription mode, the electronic device 100 converts the surrounding situation information into text and displays same.

In an embodiment of the disclosure, the electronic device 100 may convert the surrounding situation information into simple guidance phrases and output same. For example, when the user of the electronic device is walking down a street and a person included in a friend list of the user data waves and calls the user, a face is recognized by using the obtained image data and the surrounding situation information, such as "a situation where a user's friend calls the user" may be analyzed. When the electronic device 100 determines the importance of the surrounding situation information to be "medium", it enters the transcription mode 560 and outputs a phrase, such as "the user's friend is calling the user" as a virtual image, so that the user may recognize a situation in the real world even while using the electronic device 100.

When the importance is "low", a retention mode 570 is entered. In the retention mode, the electronic device 100 temporarily stores the surrounding situation information and notifies the user at a later time.

In an embodiment of the disclosure, the electronic device 100 may store the surrounding situation information in the memory 210 and output same through an output device after a predetermined period of time. For example, when the user pre-designated a specific word as a field of interest with "low importance" and the user is in a video conference or watching a video and someone nearby is having a conversation containing the keyword, the conversation content may be recorded and stored in the memory 210 so as not to disturb the user. Later, after the user stops using or operating the electronic device, the electronic device 100 may detect that the user is taking a break, output the corresponding conversation content, and provide information to the user.

In the embodiment of the disclosure, the importance is classified into three levels, but it does not necessarily need to be subdivided into three levels. In addition, according to an embodiment of the disclosure, three levels, that is, each mode, may be entered simultaneously. A method of determining importance of surrounding situation information is discussed below with reference to FIGS. 8A, 8B, and 8C.

Figure 6:
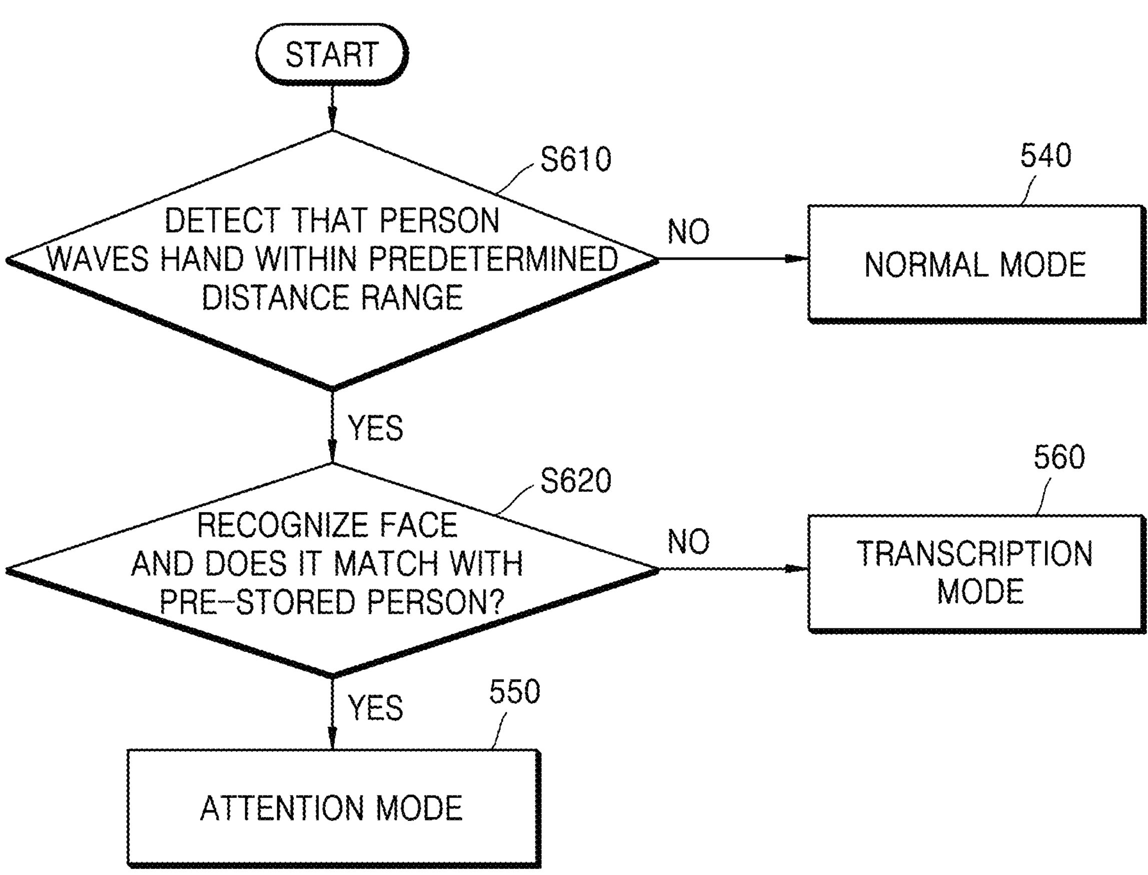
FIG. 6 is a diagram illustrating a method by which an electronic device obtains image data through a camera and determines an importance of surrounding situation information according to an embodiment of the disclosure.

FIG. 6 is a diagram illustrating a method by which an electronic device obtains image data through a camera and determines importance of surrounding situation information, according to an embodiment of the disclosure.

Referring to FIG. 6, the electronic device 100 may obtain image data, determine an importance of surrounding situation information by using the obtained image data and pre-stored history of the user, and output the surrounding situation information through an output device based on the determined importance.

In operation S610, the electronic device 100 detects that a person within a predetermined distance range is waving his or her hand. When not detecting this, the normal mode 540 is entered, and when detecting it, the process enters operation S620.

In an embodiment of the disclosure, the electronic device 100 may recognize an object included in image data obtained through the photographing unit 222. In the disclosure, an object refers to a single subject that is recognized as distinct from other subjects within image data. For example, the electronic device 100 may recognize a person's hand as an object in image data. The electronic device 100 may recognize the person's hand and detect a motion of the hand.

In operation S620, the electronic device 100 recognizes the face of a person waving the hand and checks whether the face matches a pre-registered person. When the face of the person waving the hand does not match the pre-registered person, the electronic device 100 may determine the importance of the surrounding situation information as "medium", and when the face of the person waving the hand matches with the pre-registered person, determine the importance as "high".

In an embodiment of the disclosure, the processor 110 of the electronic device 100 may determine whether the person waving the hand and a person pre-stored in the user data are the same person through matching between the image data pre-stored in the memory 210 and the image data obtained through the photographing unit 222.

In an embodiment of the disclosure, when a person included in the obtained image data is determined to be a person registered in the user data, the electronic device 100 may immediately output the surrounding situation information to the user through an output device. For example, when the recognized person matches with the person registered in the user data, the attention mode 550 is entered so that an operation being executed in the electronic device 100 (e.g., music playback or video playback) is paused, and the surrounding situation information is output through the headphone output terminal 251-2 or the speaker 251-1. For example, in a case of an AR device, music being played is paused, and the device notifies the user through the audio output unit 251 that a registered person is greeting the user.

When the recognized person does not match with the person registered in the user data, the transcription mode 560 is entered to transcribe, for example, display, the conversation content without stopping the operation being performed in the electronic device 100. For example, in the case of an AR device, the display unit 252 may display a virtual image showing that someone is greeting the user. More specifically, the corresponding information may be converted into text and displayed as a virtual image, and image data taken of the person may be output as a virtual image, but an output form is not limited thereto.

According to an embodiment of the disclosure, the electronic device may determine an importance of surrounding situation information by obtaining sound source data through a microphone. The electronic device 100 analyzes conversation content in the surrounding situation information and determines whether the conversation content is important to the user of the electronic device 100.

For example, the electronic device determines importance by comparing a keywords in the conversation content with the usage history of the user stored in the memory. When the user's name is called, the electronic device determines the importance to be "high", when a pre-stored keyword related to the user's work is mentioned, determines the importance to be "medium", and when a keyword of interest to the user is mentioned, determines the importance to be "low".

For example, in the case of an AR device, when the user no longer operates the AR device, the conversation content may be displayed as a virtual image or converted into voice data and output through the audio output unit.

Figure 7:
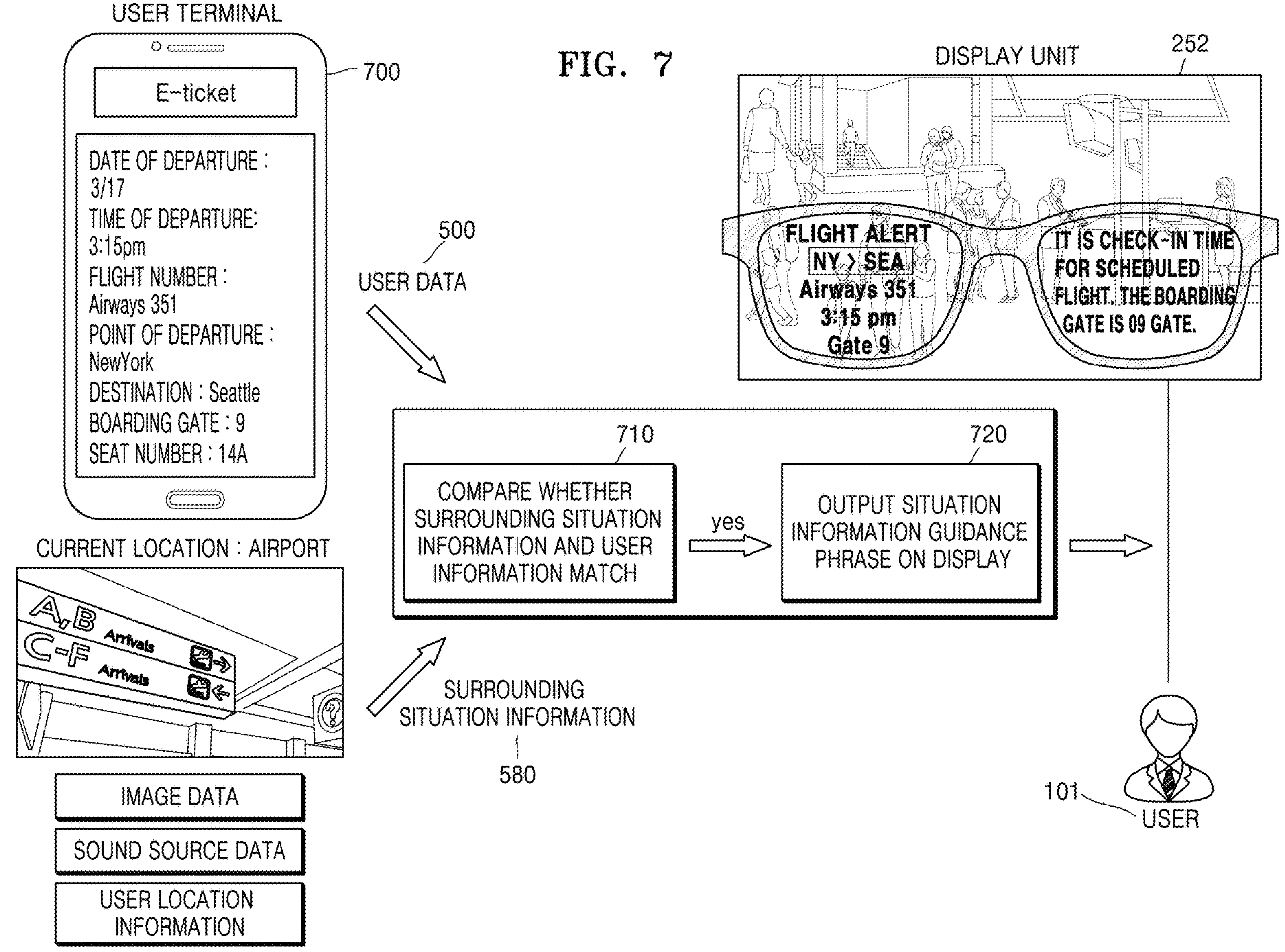
FIG. 7 is a diagram illustrating a method by which an electronic device obtains surrounding situation information, compares the surrounding situation information with user data, and outputs the surrounding situation information through an output device, according to an embodiment of the disclosure.

FIG. 7 is a diagram illustrating a method by which an electronic device obtains surrounding situation information, compares the surrounding situation information with user data, and outputs the surrounding situation information through an output device, according to an embodiment of the disclosure.

Referring to FIG. 7, in an embodiment of the disclosure, in operation 710, the electronic device 100 may compare, through the processor 110, whether the surrounding situation information 580 and the user data 500 match, and if they match, output the surrounding situation information through the output device in operation 720, and notify the user of the electronic device 100.

In an embodiment of the disclosure, the electronic device 100 may map non-verbal random events in the surrounding situation information to unique information for each user, analyze relevance, and notify the user of relevant information.

For example, the user data 500 may include the user's past conversation records, the contents of the user's e-mail, schedule records and reservation records for various applications, but is not limited thereto.

For example, the processor 110 may compare airplane ticket information in a user terminal 700 with image data including user location information indicating an airport and airplane departure information on an electronic display board at the airport, to determine whether they match. When data is mapped, the processor 110 may output the user data 500 received from the user terminal through the output unit 250. For example, the output unit 250 may output an airplane boarding information (departure time, boarding gate, or the like) on an upper left display, and guidance text (e.g., It is the check-in time for a scheduled flight. The boarding gate is 09 GATE.) may be output on an upper right display.

Figure 8A:
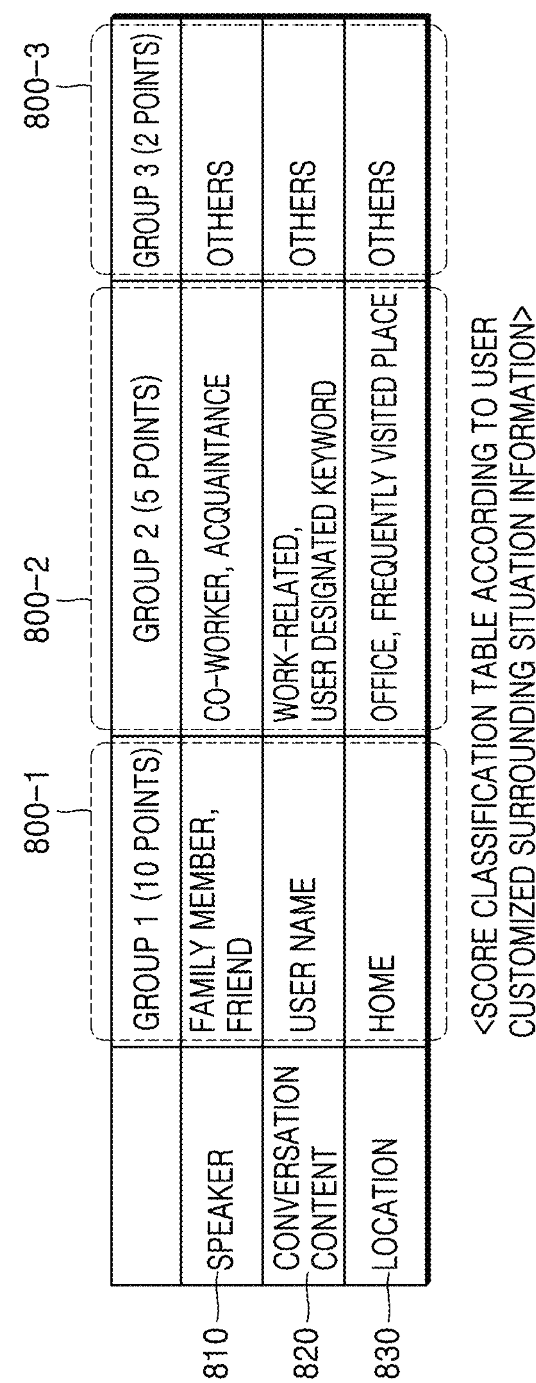
FIGS. 8A and 8B are diagrams illustrating a process of varying output devices depending on a score for importance of surrounding situation information, according to various embodiments of the disclosure.
Figure 8B:
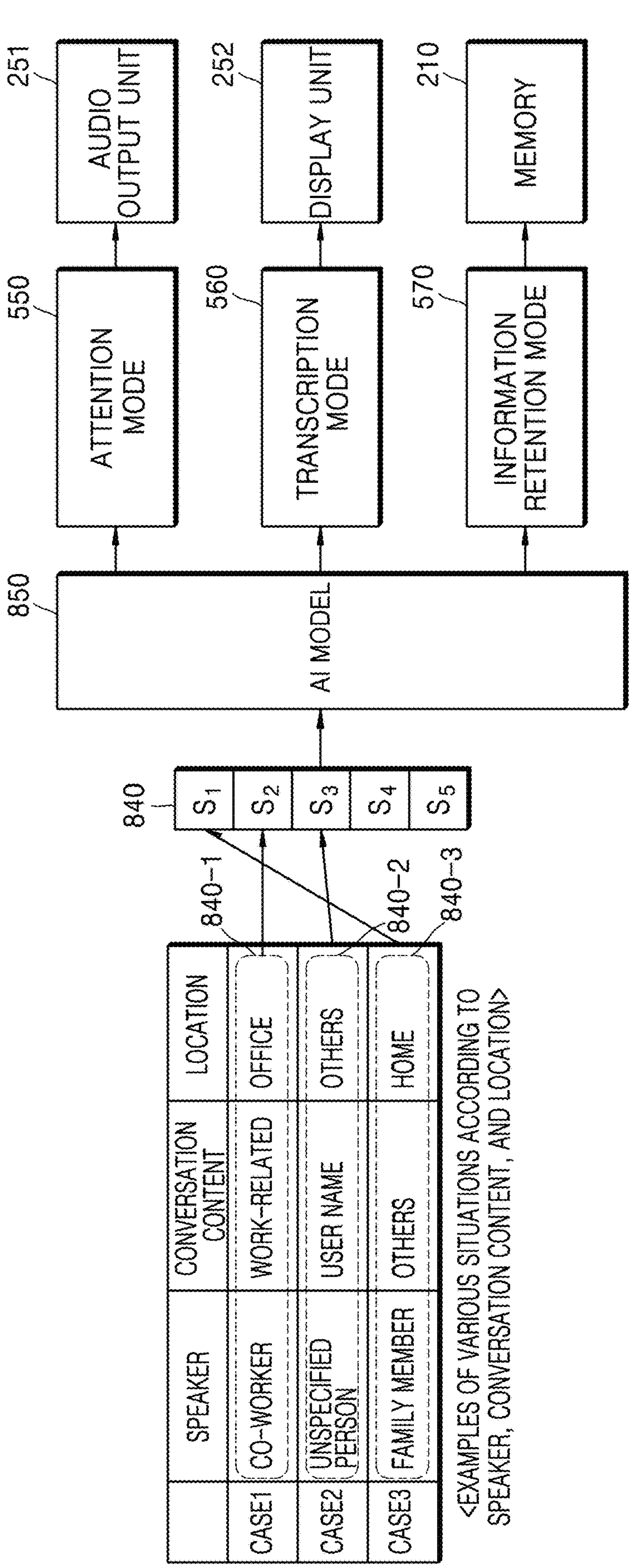

FIGS. 8A and 8B are diagrams a process of varying output devices depending on a score for importance of surrounding situation information, according to various embodiments of the disclosure.

Referring to FIGS. 8A and 8B, the processor 110 according to an embodiment of the disclosure may compare the obtained surrounding situation information 580 with the user data 500 and obtain a score. For example, when the obtained surrounding situation information 580 is the image data 581, groups may be classified differently depending on who a speaker 810 is.

Referring to a score classification table in FIG. 8A, the importance group may be divided into three groups. For example, when the speaker 810 is a family member or a friend, the speaker 810 is assigned to group 1 800-1, and when the speaker 810 is a co-worker or acquaintance, the speaker 810 is assigned to group 2 800-2. In a case of other unspecified persons who cannot be recognized, the persons are assigned to group 3 800-3.

In an embodiment of the disclosure, the score classification table may have preset values stored in the memory or may receive set values from an external server. In an embodiment of the disclosure, the score classification table does not have a fixed set value, and the setting value may be changed to suit the user as the electronic device 100 is used.

When the obtained surrounding situation information 580 is the sound source data 582, groups are classified differently depending on conversation content 820. For example, when the name of the user of the electronic device 100 is called, the surrounding situation information is classified into group 1 800-1, and when a specific keyword designated by the user, such as work-related, the surrounding situation information is classified into group 2 800-2. When keywords corresponding to other general conversation topics (e.g., weather, recent news, or the like) are recognized, the content is assigned to group 3 800-3.

When the obtained surrounding situation information 580 is the user location information 583, groups may be classified differently depending on a location 830. For example, in a case in which the user of the electronic device 100 is at home, the surrounding situation information is classified into group 1 800-1, and in a case of a place frequently visited, such as the user's office, the surrounding situation information is classified into group 2 800-2. Other locations that are not pre-stored are classified into group 3 800-3.

According to an embodiment of the disclosure, different scores may be assigned to each group. For example, group 1 may be given 10 points, group 2 may be given 5 points, and group 3 may be given 2 points. However, this is only an example in that scores are given differentially, and it does not necessarily mean that the surrounding situation information must be divided into three groups or have a specific score.

Referring to FIG. 8B, the processor 110 differentially assigns scores according to groups to each obtained surrounding situation information 580, and adds up the obtained scores to obtain an importance score of the surrounding situation information for each situation.

For example, as in CASE1 840-1, when the speaker is a co-worker, the surrounding situation information is classified into group 2, when the conversation is work-related, the surrounding situation information is classified into group 2, and when the location is an office, the surrounding situation information is classified into group 2. A score of each input data is 5 points. When the scores are added up, the score becomes 15 points, and the importance score of the current surrounding situation information becomes 15 points.

For example, as in CASE2 840-2, when the speaker is an unspecified person, the surrounding situation information is classified into group 3, when the conversation content includes the name of the user 101 of the electronic device, the surrounding situation information is classified into group 1, and when the location is not a stored location, the surrounding situation information is classified into group 3. Because the scores of the input data are 2 points, 10 points, and two points, respectively, the importance score of the current surrounding situation information obtained by adding these scores becomes 14 points.

For example, as in CASE2 840-3, when the speaker is a family member, the surrounding situation information is classified into group 1, when the conversation content includes others, the surrounding situation information is classified into group 3, and when the location. is home, the surrounding situation information is classified into group 1.

Because the scores of the input data are 10 points, 2 points, and 10 points, respectively, the importance score of the current surrounding situation information obtained by adding these scores becomes 22 points.

According to an embodiment of the disclosure, the processor 110 may be a machine learning model trained through supervised learning, which applies an importance score 840 that is obtained to an artificial intelligence model 850 as input data, predicts how important the surrounding situation information is to be determined by the user, and enters an appropriate mode. For example, the artificial intelligence model 850 may include at least one model from among a decision tree, a random forest, a Naive Bayes classification network, a support vector machine (SVM), and an artificial neural network, but is not limited thereto.

When the attention mode 550 is entered, the processor 110 may determine an output data type of the obtained surrounding situation information as sound source data and output same through the audio output unit 251.

When the transcription mode 560 is entered, the processor 110 may determine an output data type of the obtained surrounding situation information as image data and output same through the display unit 252. When the retention mode 570 is entered, the processor 110 may temporarily store the obtained surrounding situation information in the memory 210.

A specific embodiment for identifying an output data type and output device of the surrounding situation information according to the obtained importance score is described with reference to FIG. 8C.

Figure 8C:
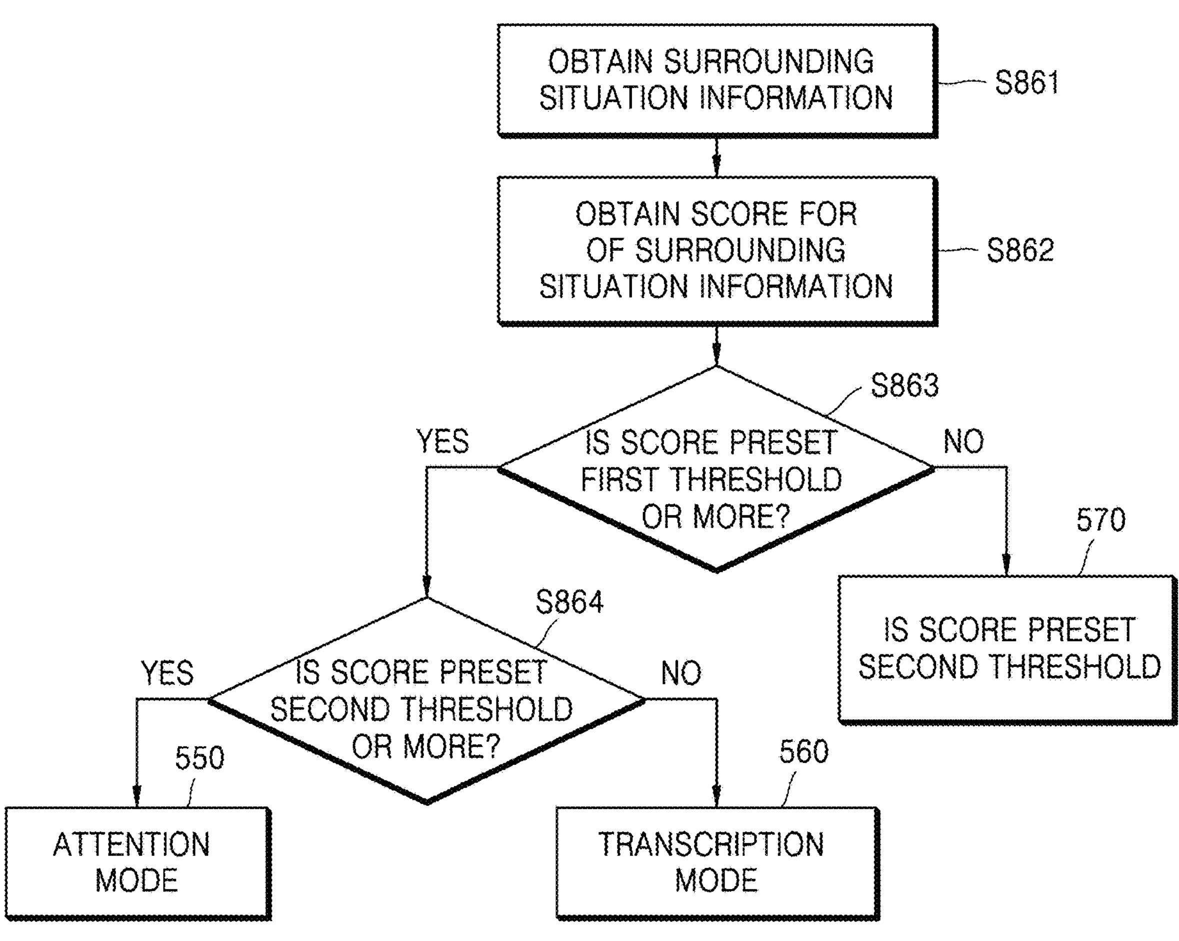
FIG. 8C is a flowchart of classifying importance of surrounding situation information according to a score for the importance of the surrounding situation information, according to an embodiment of the disclosure.

FIG. 8C is a flowchart of classifying importance of surrounding situation information according to a score for the importance of the surrounding situation information, according to an embodiment of the disclosure.

Referring to FIG. 8C, in operation S861, the electronic device 100 obtains surrounding situation information. In operation S861, the surrounding situation information may be received from the input unit 220 of the electronic device 100 or from an external electronic device or an external server.

In operation S862, the electronic device 100 obtains a score for an importance of the obtained surrounding situation information. In an embodiment of the disclosure, input data (e.g., sound data, image data, current location information of user, or the like) obtained from various sensors (e.g., microphone, photographing unit, user location sensor, or the like) may be divided into groups and given scores according to a pre-stored score classification table. By adding up the scores obtained by each input data, a comprehensive importance score for current surrounding situation information may be obtained. A method of obtaining the score is the same as described with reference to FIG. 8B, and redundant descriptions thereof are omitted.

In operation S863, the electronic device 100 determines whether the obtained score is a preset threshold or more. The threshold may be two or more thresholds, such as first and second thresholds. When the score is less than the first threshold, the retention mode 570 may be entered. In the retention mode, the electronic device 100 may temporarily store the surrounding situation information. In operation S863, when the score is the first threshold or more, operation S864 may be entered.

In operation S864, it is determined whether the score is the preset second threshold or more. Here, the second threshold may be greater than the first threshold of operation S863. When the score is the second threshold or more, it may correspond to a case in which the importance of the surrounding situation information is very high. Accordingly, the processor 110 may immediately notify the surrounding situation information to the user of the electronic device 100. Specifically, the processor 110 may enter the attention mode 550 to control the audio output unit 251 or output the surrounding situation information through the audio output.

When the score is less than the second threshold, it may correspond to a case in which the importance of the surrounding situation information is high to a certain level. The processor 110 may enter the transcription mode 560 to convert the surrounding situation information into text and output same through the display unit 252.

Figure 9:
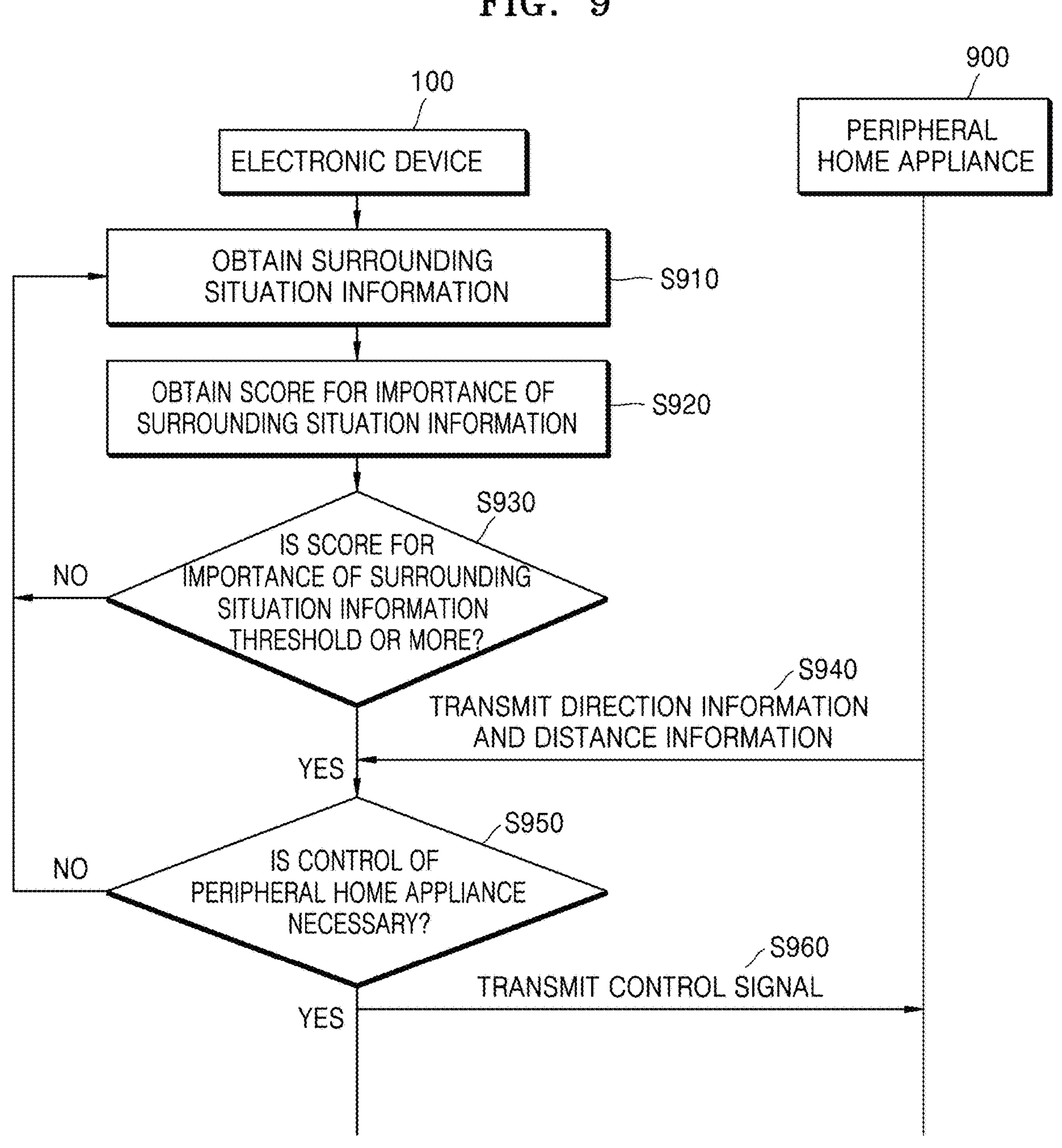
FIG. 9 is a flowchart illustrating a method by which an electronic device controls peripheral home appliances according to importance of surrounding situation information, according to an embodiment of the disclosure.

FIG. 9 is a flowchart illustrating a method by which an electronic device controls peripheral home appliances according to importance of surrounding situation information according to an embodiment of the disclosure.

Referring to FIG. 9, the electronic device 100 and a peripheral home appliance 900 may be connected to each other through a wired or wireless communication network and may transmit and receive data. For example, the electronic device 100 and the peripheral home appliance 900 may be connected by using at least one data communication network from among wired LAN, wireless LAN, Bluetooth, zigbee, Wii-Fi Direct (WFD), Bluetooth low energy (BLE), wireless broadband Internet (Wibro), world interoperability for microwave access (WiMAX), shared wireless access protocol (SWAP), wireless gigabit alliance (WiGig), and RF communication.

Operations S910, S920, and S930 are the same as operations in FIG. 8C, and redundant descriptions thereof are omitted. In operation S930, when the importance score of the surrounding situation information is less than a preset threshold, the process returns to operation S910 to obtain new surrounding situation information.

When the importance score is greater than the preset threshold, direction information and distance information are received from the peripheral home appliance 900 (operation S940). For example, information indicating that a peripheral home appliance (e.g., a TV) is approximately 20 m away from the electronic device 100 and is located to the right of the electronic device.

In operation S950, the electronic device 100 may determine whether control of the peripheral home appliance 900 is necessary. In an embodiment of the disclosure, the embodiment of the disclosure may receive a sound of the peripheral home appliance 900 from the microphone 221 of the input unit and measure the sound volume. For example, when a maximum noise level of the peripheral home appliance 900 at a distance of about 20 m from the electronic device 100 is 70 dB, the user 101 of the electronic device 100 may determine that it is hindrance to obtaining the surrounding situation information. In an embodiment of the disclosure, the electronic device 100 may identify whether the peripheral home appliance 900 is within a field of view of the user 101 from the photographing unit 222 of the input unit. For example, when the maximum noise level of the peripheral home appliance 900 at a distance of about 30 m away from the electronic device 100 is 10 dB and the peripheral home appliance cannot be identified within the field of view of the user (e.g., located behind the wall), the electronic device 100 may determine that there is no need to control the peripheral home appliance.

When it is determined that there is no need to control the peripheral home appliance, the process returns to operation S910.

In operation S960, when it is determined that control of the peripheral home appliance is necessary, the electronic device 100 may transmit a control signal for the peripheral home appliance 900 through the communication unit 240. The electronic device 100 may control the peripheral home appliance 900 based on the control signal. For example, the peripheral home appliance 900 receiving the control signal may stop an operation being executed or perform an operation to lower the sound. In another example, the peripheral home appliance 900 receiving the control signal from the electronic device 100 may lower a sound of music being played to an appropriate level or pause an image being reproduced.

A machine-readable storage medium may be provided in the form of a non-transitory storage medium. Here, the "non-transitory storage medium" is a tangible device and only denotes that it does not include a signal (e.g., electromagnetic waves), and this term does not distinguish a case in which data is semi-permanently stored in the storage medium from a case in which data is temporarily stored in the storage medium. For example, the "non-transitory storage medium" may include a buffer in which data is temporarily stored.

According to an embodiment of the disclosure, methods according to various embodiments disclosed in the disclosure may be provided and included in a computer program product. The computer program product are commodities and may be traded between sellers and buyers. The computer program product may be distributed in the form of a machine-readable storage medium (e.g., compact disc read only memory (CD-ROM)) or may be distributed through an application store, between two user devices (e.g., smartphones), or in person or via online (e.g., downloaded or uploaded). In a case of online distribution, at least a portion of the computer program product (e.g., a downloadable app) may be at least temporarily stored in a machine-readable storage medium, such as memory of a manufacturer's server, an application store's server, or a relay server, or may be temporarily generated.

The foregoing description of the disclosure is for illustrative purposes, and a person skilled in the art to which the disclosure pertains would understand that the disclosure can be easily modified into another specific form without changing the technical idea or essential features thereof. Therefore, the embodiments described above should be understood in all respects as illustrative and not restrictive. For example, each component described as unitary may be implemented in a distributed manner, and similarly, components described as distributed may also be implemented in a combined form.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

at least one input device;

at least one output device;

memory storing one or more computer programs; and one or more processors communicatively coupled to the at least one input device, the at least one output device, and the memory, wherein the one or more computer programs include computer-executable instructions that, when executed by the one or more processors individually or collectively, cause the electronic device to:

obtain surrounding situation information from the at least one input device, determine whether the surrounding situation information is information of interest to a user of the electronic device by comparing the surrounding situation information with at least one of usage history or a conversation record of the user, wherein the at least one of usage history is data stored while the electronic device is used by the user, determine an importance of the surrounding situation information based on the surrounding situation information being determined to be the information of interest to the user, and output the surrounding situation information through the at least one output device based on the determined importance of the surrounding situation information.

2. The electronic device of claim 1, wherein the at least one input device further comprises at least one microphone, and wherein the one or more computer programs further include computer-executable instructions that, when executed by the one or more processors individually or collectively, cause the electronic device to:

obtain sound source data from the at least one microphone, and determine the importance of the surrounding situation information by further using the sound source data.

3. The electronic device of claim 2, wherein the at least one input device further comprises at least one photographing unit, and wherein the one or more computer programs further include computer-executable instructions that, when executed by the one or more processors individually or collectively, cause the electronic device to:

obtain image data from the at least one photographing unit, and determine the importance of the surrounding situation information by further using the image data.

4. The electronic device of claim 3, wherein the at least one input device further comprises a first sensor configured to detect data related to a user location, and wherein the one or more computer programs further include computer-executable instructions that, when executed by the one or more processors individually or collectively, cause the electronic device to:

obtain, by using the first sensor, user location information representing a current location of the user; and determine the importance of the surrounding situation information by further using the user location information.

5. The electronic device of claim 2, wherein the at least one input device further comprises a first sensor configured to detect data related to a user location, and wherein the one or more computer programs further include computer-executable instructions that, when executed by the one or more processors individually or collectively, cause the electronic device to:

obtain, by using the first sensor, user location information representing a current location of the user; and determine the importance of the surrounding situation information by further using the user location information.

6. The electronic device of claim 1, wherein the at least one input device further comprises at least one photographing unit, and wherein the one or more computer programs further include computer-executable instructions that, when executed by the one or more processors individually or collectively, cause the electronic device to:

obtain image data from the at least one photographing unit, and determine the importance of the surrounding situation information by using the image data.

7. The electronic device of claim 6, wherein the at least one input device further comprises a first sensor configured to detect data related to a user location, and wherein the one or more computer programs further include computer-executable instructions that, when executed by the one or more processors individually or collectively, cause the electronic device to:

obtain, by using the first sensor, user location information representing a current location of the user; and determine the importance of the surrounding situation information by further using the user location information.

8. The electronic device of claim 1, further comprising: an ultra-wideBand (UWB) communication circuit, wherein the one or more computer programs further include computer-executable instructions that, when executed by the one or more processors individually or collectively, cause the electronic device to:

receive a UWB signal from a peripheral home appliance through the UWB communication circuit, obtain direction information and distance information of the peripheral home appliance based on the received UWB signal, and transmit a control signal to the peripheral home appliance according to the determined importance of the surrounding situation information based on the obtained direction information and distance information.

9. The electronic device of claim 1, wherein the one or more computer programs further include computer-executable instructions that, when executed by the one or more processors individually or collectively, cause the electronic device to:

obtain a score for the importance of the obtained surrounding situation information;

identify surrounding situation information of which the score is a preset first threshold or more;

identify a type of output data and the at least one output device corresponding to the type of the output data, based on the score of the identified surrounding situation information; and control the at least one identified output device to output the output data.

10. A method by which an electronic device controls at least one output device, the method comprising:

obtaining surrounding situation information from at least one input device;

determining, by one or more processors of the electronic device, whether the surrounding situation information is information of interest to a user of the electronic device by comparing the surrounding situation information with at least one of usage history or a conversation record of the user, wherein the at least one of usage history is data stored while the electronic device is used by the user;

determining, by the one or more processors of the electronic device, an importance of the surrounding situation information based on the surrounding situation information being determined to be the information of interest to the user; and outputting the surrounding situation information through the at least one output device based on the determined importance of the surrounding situation information.

11. The method of claim 10, wherein the determining of the importance of the surrounding situation information comprises:

obtaining sound source data from a microphone; and determining the importance of the surrounding situation information by further using the sound source data.

12. The method of claim 10, wherein the determining of the importance of the surrounding situation information comprises:

obtaining user location information representing a current location of the user from a first sensor configured to detect data related to a user location; and determining the importance of the surrounding situation information by further using the user location information.

13. The method of claim 10, wherein the determining of the importance of the surrounding situation information comprises:

obtaining image data from a photographing unit; and determining the importance of the surrounding situation information by further using the image data.

14. The method of claim 10, further comprising:

receiving an ultra-wideBand (UWB) signal from a peripheral home appliance;

obtaining direction information and distance information of the peripheral home appliance based on the received UWB signal; and transmitting a control signal to the peripheral home appliance according to the determined importance of audio data based on the obtained direction information and distance information.

15. The method of claim 10, wherein the determining of the importance of the surrounding situation information further comprises:

obtaining a score for the importance of the surrounding situation information; and identifying surrounding situation information of which the score is a preset first threshold or more.

16. The method of claim 10, wherein the outputting of the surrounding situation information through the at least one output device comprises:

identifying, based on the determined importance of the surrounding situation information, a type of output data and at least one output device corresponding to the type of the output data from among the at least one output device; and controlling at least one identified output device to output the output data.

17. One or more non-transitory computer-readable storage media storing computer-executable instructions that, when executed by one or more processors individually or collectively, cause an electronic device to perform operations, the operations comprising:

obtaining surrounding situation information from at least one input device;

determining whether the surrounding situation information is information of interest to a user of the electronic device by comparing the surrounding situation information with at least one of usage history or a conversation record of the user, wherein the at least one of usage history is data stored while the electronic device is used by the user;

determining an importance of the surrounding situation information based on the surrounding situation information being determined to be the information of interest to the user; and outputting the surrounding situation information through at least one output device based on the determined importance of the surrounding situation information.

18. The one or more non-transitory computer-readable storage media of claim 17, wherein the determining of the importance of the surrounding situation information comprises:

obtaining sound source data from a microphone;

obtaining image data from a photographing unit;

obtaining user location information representing a current location of the user from a first sensor configured to detect data related to a user location; and determining the importance of the surrounding situation information by further using the sound source data, the image data, and the user location information.

19. The one or more non-transitory computer-readable storage media of claim 17, wherein the determining of the importance of the surrounding situation information comprises:

obtaining image data from a photographing unit; and determining the importance of the surrounding situation information by further using the image data.

20. The one or more non-transitory computer-readable storage media of claim 17, wherein the determining of the importance of the surrounding situation information comprises:

obtaining user location information representing a current location of the user from a first sensor configured to detect data related to a user location; and determining the importance of the surrounding situation information by further using the user location information.

* * * * *